Figure 6:
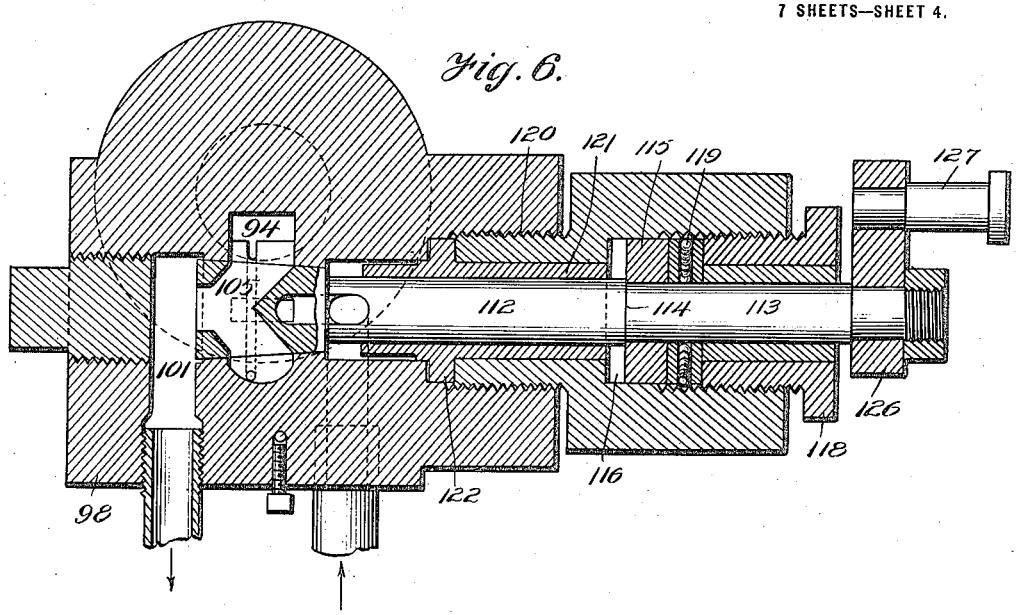

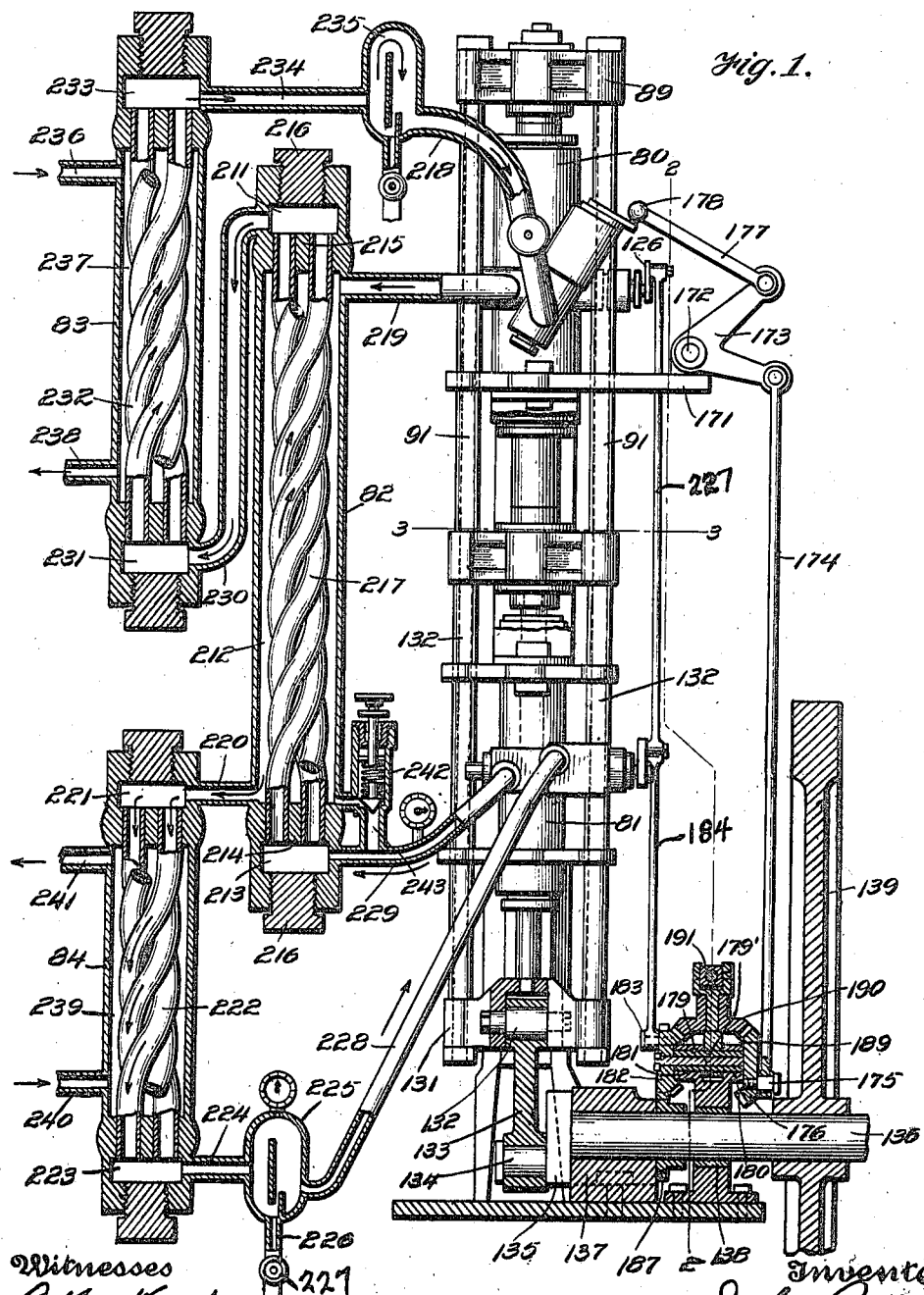

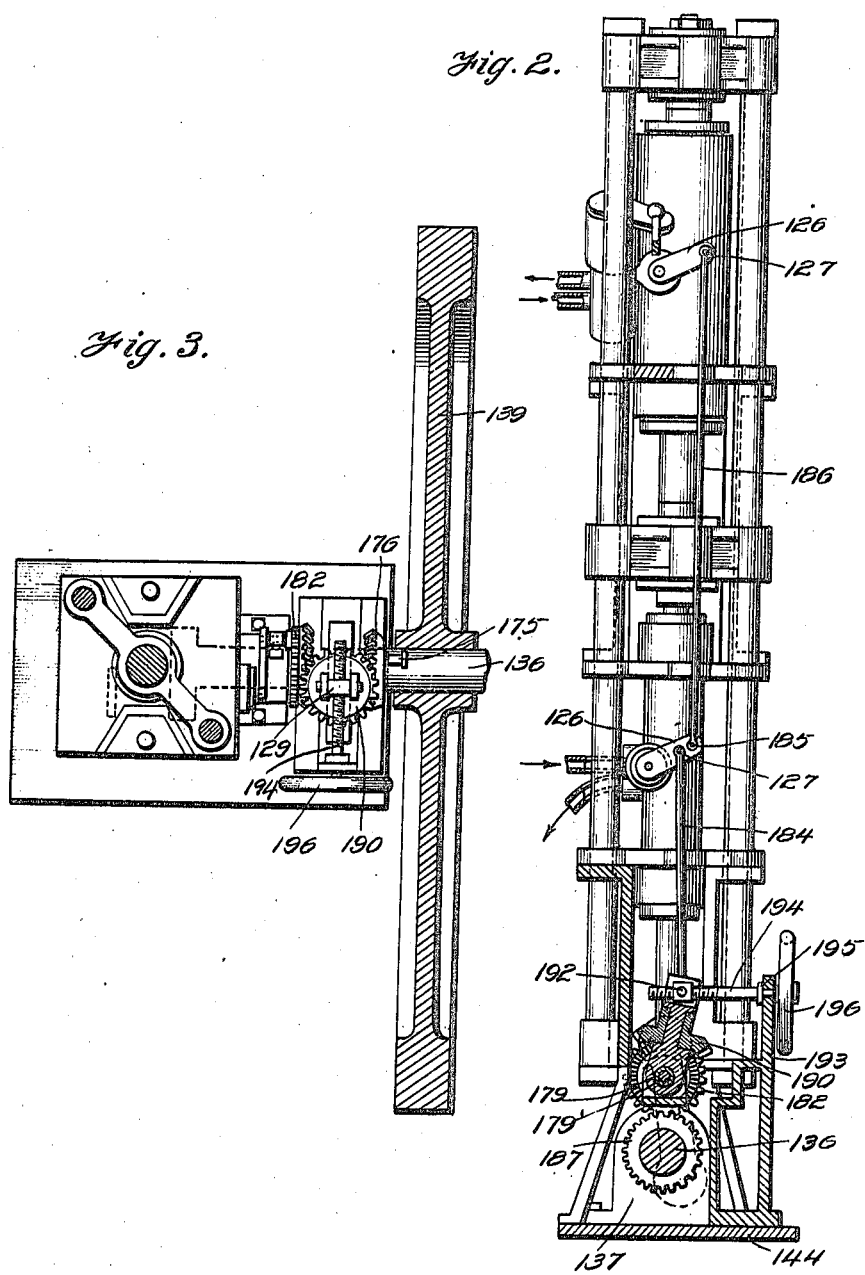

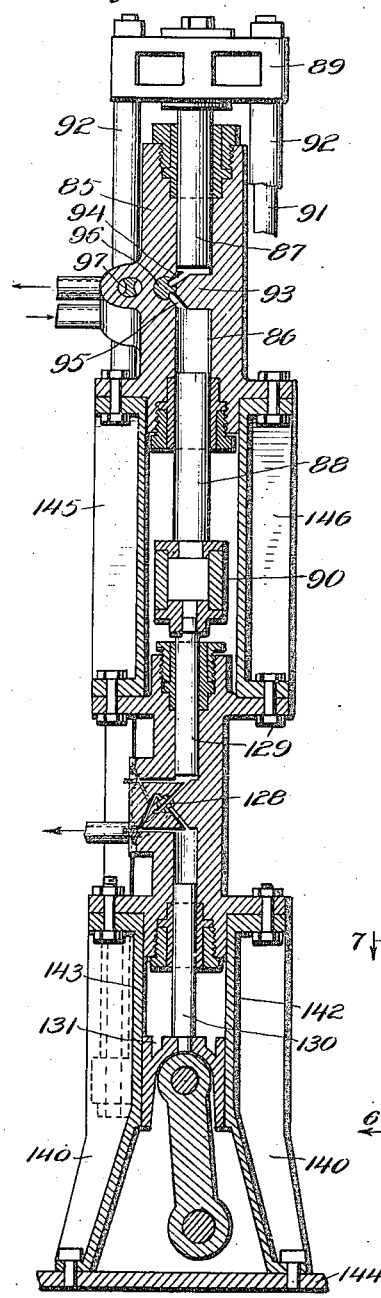
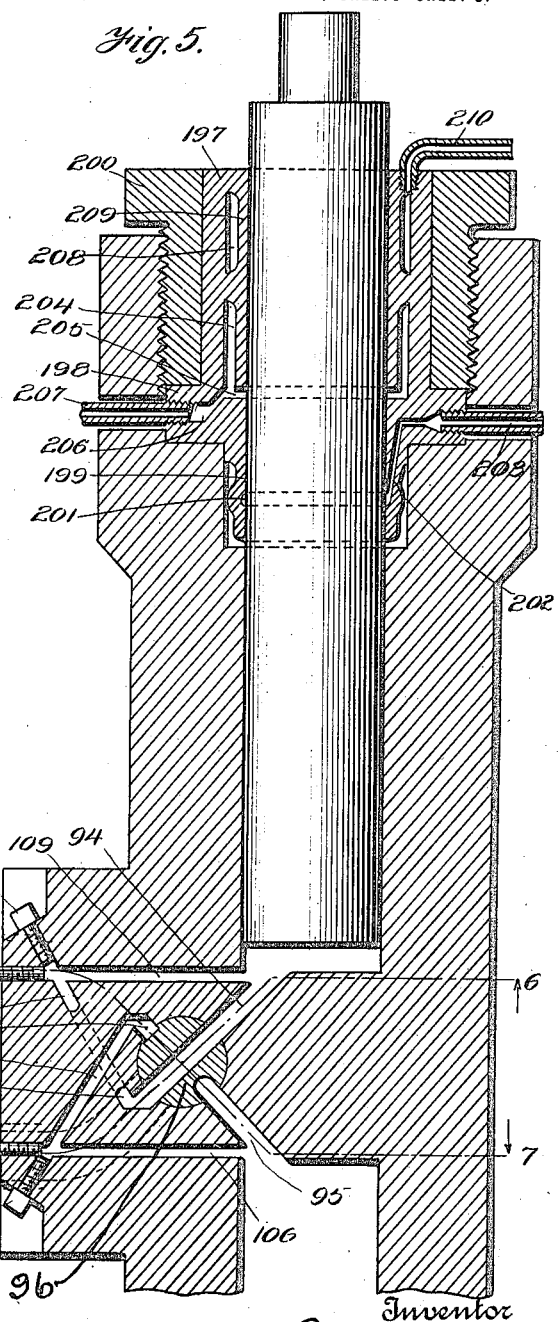

J. PATTEN.
POWER GENERATING SYSTEM.
APPLICATION FILED MAR. 18, 1912.

1,154,880.

Patented Sept. 28, 1915.
7 SHEETS—SHEET 4.

J. PATTEN.
POWER GENERATING SYSTEM.
APPLICATION FILED MAR. 18, 1912.
1,154,880.
Patented Sept. 28, 1915.
7 SHEETS—SHEET 5.
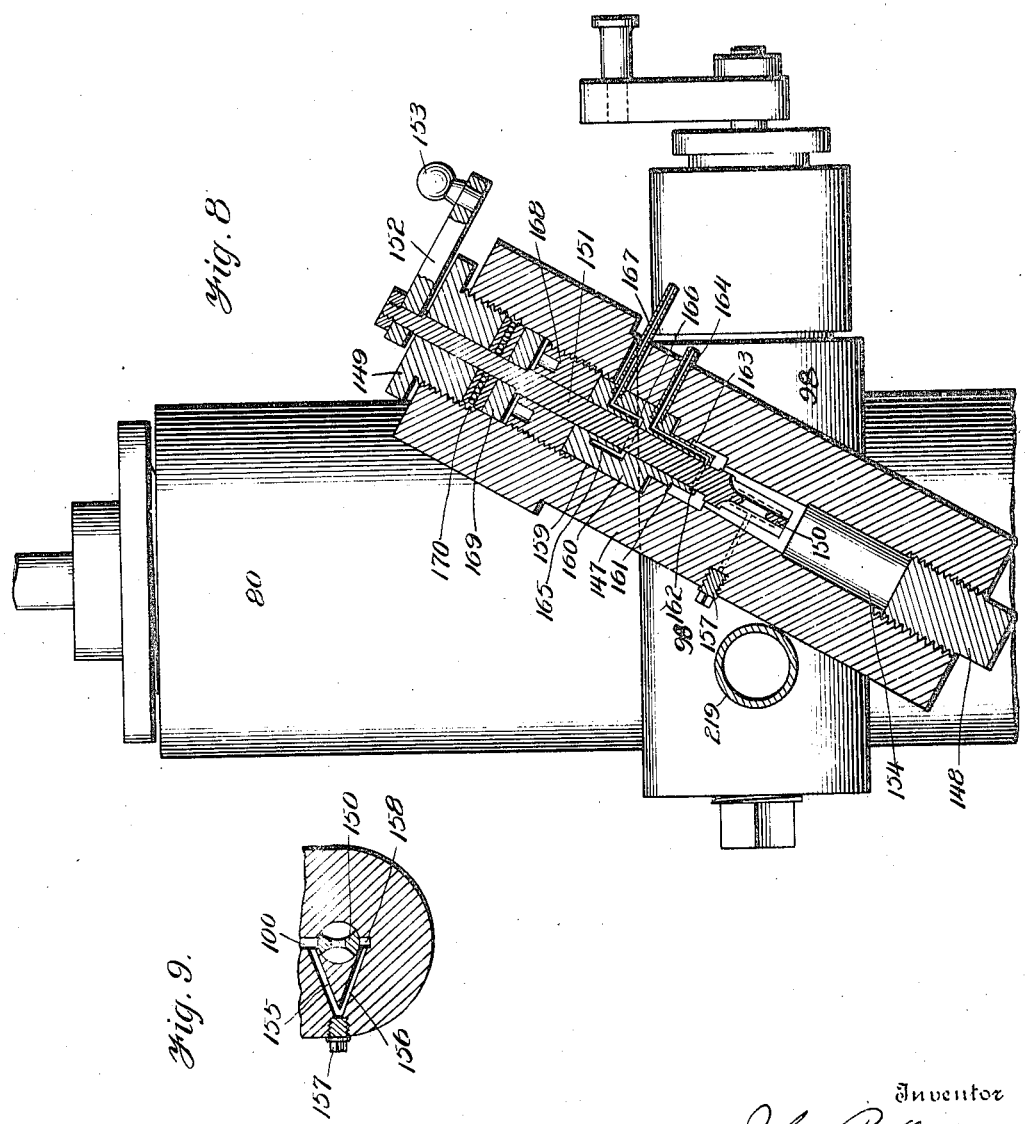

J. PATTEN.
POWER GENERATING SYSTEM.
APPLICATION FILED MAR. 18, 1912.

1,154,880.

Patented Sept. 28, 1915.
7 SHEETS—SHEET 7.

UNITED STATES PATENT OFFICE.

JOHN PATTEN, OF BALTIMORE, MARYLAND.

POWER-GENERATING SYSTEM.

1,154,880. Specification of Letters Patent. Patented Sept. 28, 1915.

Application filed March 18, 1912. Serial No. 684,554.

*To all whom it may concern:*

Be it known that I, JOHN PATTEN, a citizen of the United States, residing at Baltimore, Maryland, have invented certain new and useful Improvements in Power-Generating Systems, of which the following is a specification.

My invention relates to a method and apparatus for converting heat into mechanical work, wherein a working fluid passes through a cycle of operations in which it is always maintained substantially at or above the critical temperature and pressure.

I use as my working fluid carbon-dioxid and the principles and cycle utilized differ from those of other heat motors.

My invention differs broadly from gas engines owing to the fact that the working fluid, in the cycle which I employ, is always in the region of or above the critical pressure, the low pressure of my cycle being about 100 times greater than the low pressure of the cycle for gas engines.

By the term "gas engines" I refer to all engines in which heat is converted into mechanical energy by the expansion of a gas.

My cycle furthermore depends principally upon physical or chemical molecular changes, in my working fluid, which manifest themselves by changes in volumes which do not conform to the laws of expansion and contraction of gases by heat and pressure. The gases used in gas engines approximately obey Boyle's law for changes in pressure, that is, the volume varies inversely with the pressure, and they also approximately conform to the law of Marriot, their volume at constant pressure being approximately proportional to the temperature above absolute zero, and consequently gas engines are of little commercial value except when working between high ranges of temperature. The small change in volume that would take place in the gases now commonly employed in gas engines, when passed through the range of temperature between the live steam and the cooling water of the condenser of steam engines, would render the gas engine impracticable and, therefore, from a practical standpoint gas engines heretofore invented will not work successfully at the ordinary temperatures of steam. In my cycle the fluid is worked at or below the temperatures used in the steam engine and I preferably use live steam for supplying the heat, but I may, in practising my invention, utilize the heat of exhaust steam, which would not be practicable with gas engines heretofore used. I utilize the phenomenon, that carbon-dioxid at or near its critical pressure and temperature occupies about one-fifth of the volume that the theory of gases calls for, by compressing it while it occupies this relatively small volume. I then heat this high pressure carbon-dioxid in any desirable manner but preferably by the carbon dioxid exhausted by my engine and by steam, as I prefer to lubricate the working parts of my apparatus by mixing lubricating oil with the carbon dioxid and by using steam to heat the working fluid to the maximum temperature there is no danger of getting excessive temperatures which would decompose the oil.

In my cycle the low pressure will normally range from 1000 to 1500 lbs. per square inch and the high pressure will preferably range from 3000 to 6000 lbs. per square inch. The critical pressure of carbon dioxid is approximately 77 atmospheres or 1130 lbs. per square inch so that it will be seen that the low pressure side of my cycle will be in the region of the critical pressure.

I have made extensive experiments to determine the characteristics of carbon dioxid under various conditions of pressure and temperature and I have obtained results which closely agree with the table of values of the product of the pressure and volume of a definite quantity of carbon dioxid as given on page 448 of vol. 1 of John Castell-Evans's *Physico-Chemical Tables*, published in 1902 by Charles Griffin and Company, of London. In order that the principles of my invention may be more readily understood the following values for the product of the pressure and volume are cited from the above-mentioned table.

| Pressure in atmospheres. | Temperature in centigrade. | | | | | |
|---|---|---|---|---|---|---|
| | 0° | 20° | 30° | 40° | 60° | 137° |
| 1 | 1.0000 | | | | | |
| 50 | .1050 | 0.6800 | 0.7750 | 0.8500 | 0.9840 | 1.3800 |
| 75 | .1535 | .1800 | .2130 | .6200 | .8410 | 1.3185 |
| 100 | .2020 | .2285 | .2550 | .3000 | .6610 | 1.2590 |
| 200 | .3850 | .4190 | .4400 | .4675 | .5425 | 1.0960 |
| 300 | .5595 | .5985 | .6225 | .6485 | .7100 | 1.1080 |
| 400 | .7280 | .7710 | .7950 | .8230 | .8840 | 1.2175 |

The critical temperature of carbon dioxid is approximately 31° C. and a comparison of the values given in the above table will clearly illustrate the phenomena which I have utilized in my cycle. It will be observed that, with the value for one atmosphere of pressure and 0° C. as unity, the value for 75 atmospheres and 30° C., which is the nearest value to the critical condition given, is 0.2190. For 300 atmospheres and 30° the value is 0.6225 which shows that the fluid, in being compressed from 75 to 300 atmospheres, behaves much like a liquid, as the pressure is increased four times and the volume decreased only about one-third. The value for a pressure of 300 atmospheres and 137° C., which is about the temperature of saturated steam under 50 lbs. pressure, is 1.1080, which shows that the volume is almost doubled in heating the fluid from 30° C. to 137° C. when under a pressure of 300 atmospheres. At pressures above the critical pressure and at temperatures materially above the critical temperature carbon dioxid behaves much like a permanent gas.

The cycle of operation which I employ consists of, 1st. Compressing the working fluid from substantially critical pressure and temperature to a higher pressure. 2nd. Supplying heat to the compressed working fluid. 3rd. Expanding the heated high pressure fluid in an engine whereby a large part of the heat supplied is converted into work. 4th. Exhausting and cooling the working fluid to substantially the critical pressure and temperature.

It will be observed that, in all the steps of the cycle, the working fluid is maintained substantially at or above the critical temperature and pressure and therefore none of the heat which is supplied is spent as latent heat. The utilization of this fact, together with the phenomenon that carbon dioxid behaves much like a liquid in being compressed from critical pressure and temperature and when thus compressed is capable of expanding to such a great extent with a relatively small increase in temperature, constitutes a new method of converting heat into mechanical work and I therefore claim this broadly as my invention.

In some respects my invention resembles a vapor engine (to which class the steam engine belongs), which condenses the working fluid to a liquid state at the cold end of the apparatus and then after compressing it to a higher pressure, converts it into vapor by the application of heat; but my invention differs from engines of that class by not having latent heat of vaporization to contend with.

Steam engines usually have a thermal efficiency of from 5% to 20%. About 8/10 of the heat actually applied to the water is expended in converting it into steam and practically all of this amount is carried out of the engine with the exhaust and reappears in the condenser; usually not more than 1/10 of the heat of the steam being converted into work. The thermal efficiency of other vapor engines will vary little from that of the steam engine because the latent heat of vaporization of the vapor used is approximately proportional to the work they will do in an engine, so that my invention differs from all vapor engines by eliminating the heat of vaporization which in vapor engines is wasted in the cooling water of the condenser. In one sense my working fluid is already in a vaporous state, being above the critical point, and will expand indefinitely like other highly compressed gases without the application of heat, that is, if the pressure should be released; and notwithstanding this fact the great economy of my invention is made possible by the fact that the compressed carbon dioxid as it enters the compressor of my apparatus occupies approximately the same volume that the liquid carbon dioxid would occupy if heated to that temperature. This small volume is due to the fact, as above described, that carbon dioxid does not obey Boyle's law and although it is above the critical point, its volume corresponds to that of the liquid instead of the gas. By heating the high pressure carbon dioxid it is expanded to a much larger volume, after which it is utilized in the engine and discharged under the lower pressure. The expansion in the engine does not reduce the temperature to that of the cold end and consequently the relatively hot low pressure carbon dioxid exhausted from the engine may be utilized to preliminarily heat the high pressure carbon dioxid before the former is finally cooled and returned to the compressor.

Like other heat motors the power available depends upon the difference in volume of the working fluid at the hot and cold ends of the apparatus. Hence, the principal features of my invention which enable me to obtain a much higher thermal efficiency than can be obtained by other gas or vapor engines are: First: that my invention has advantage over the vapor engines, by reducing the working fluid to a volume corresponding to that of the liquid without liquefying it and consequently without developing latent heat to be carried away by the cooling water; and, second: by expanding the working fluid by means of a moderate heat to a volume corresponding to that of the gas, without applying heat to change it from a liquid to a vapor. These, together with other new features of my invention, enable me to obtain in practice a much greater thermal efficiency than is obtainable with the steam engine or with other vapor motors.

In the apparatus, by which I carry out my new method, the engine and compressor cylinders are small and the great changes in volume and pressure, which I obtain, enables me to use the working fluid at much lower temperatures than is required by gas engines, and at the same time obtain, in practice, from two to four or more times the efficiency obtainable in gas engines as heretofore used.

Figure 7:
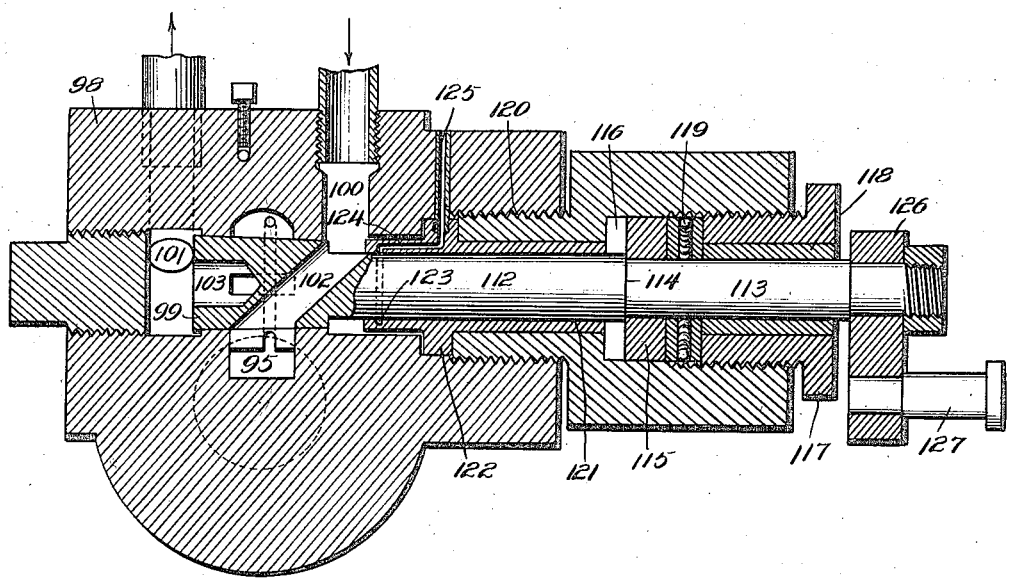
Figure 10:
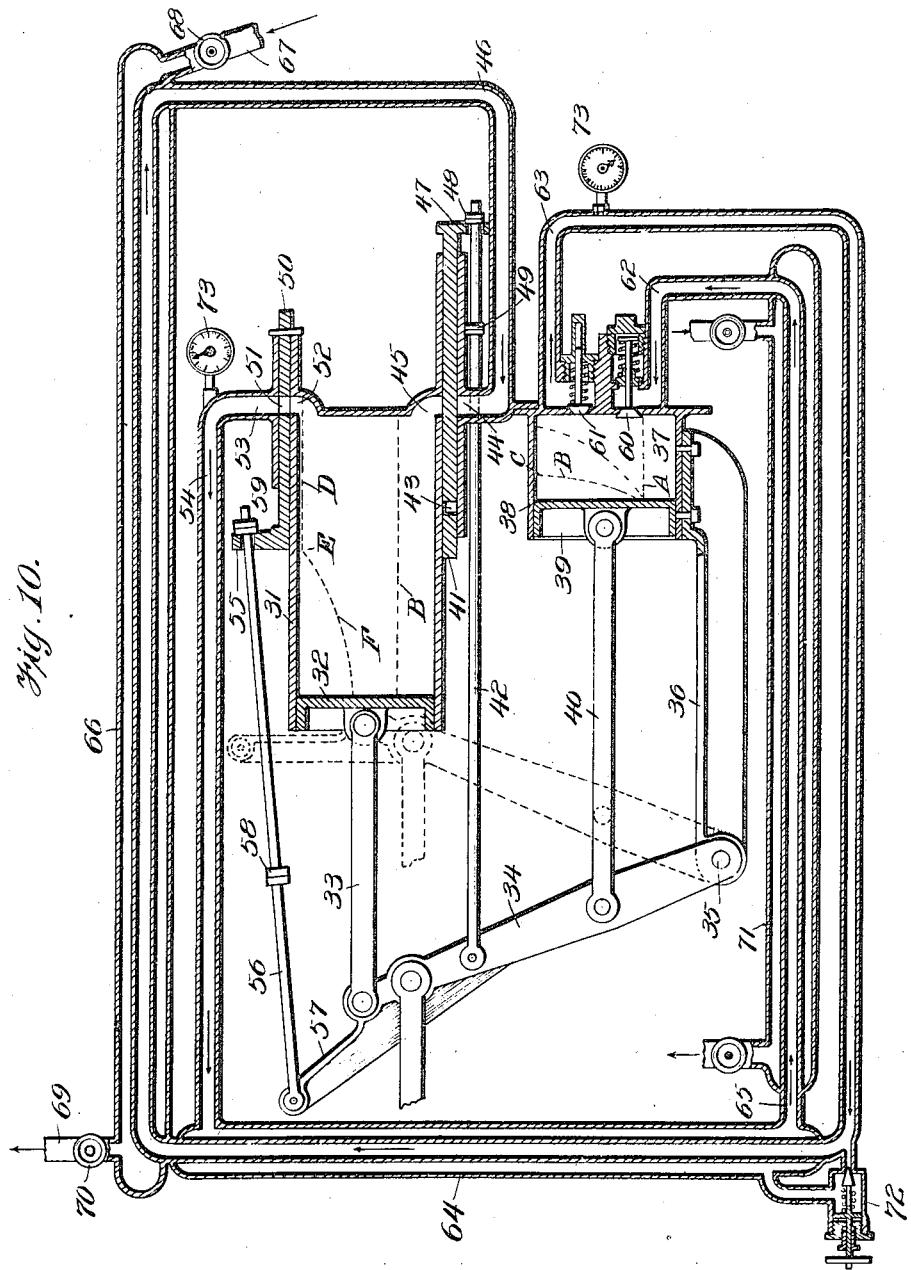
Figure 11:
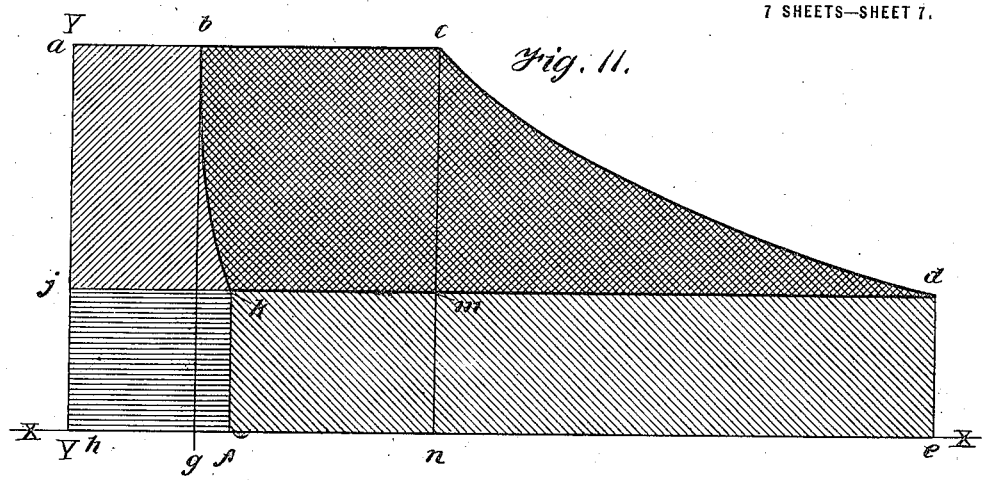
Figure 12:
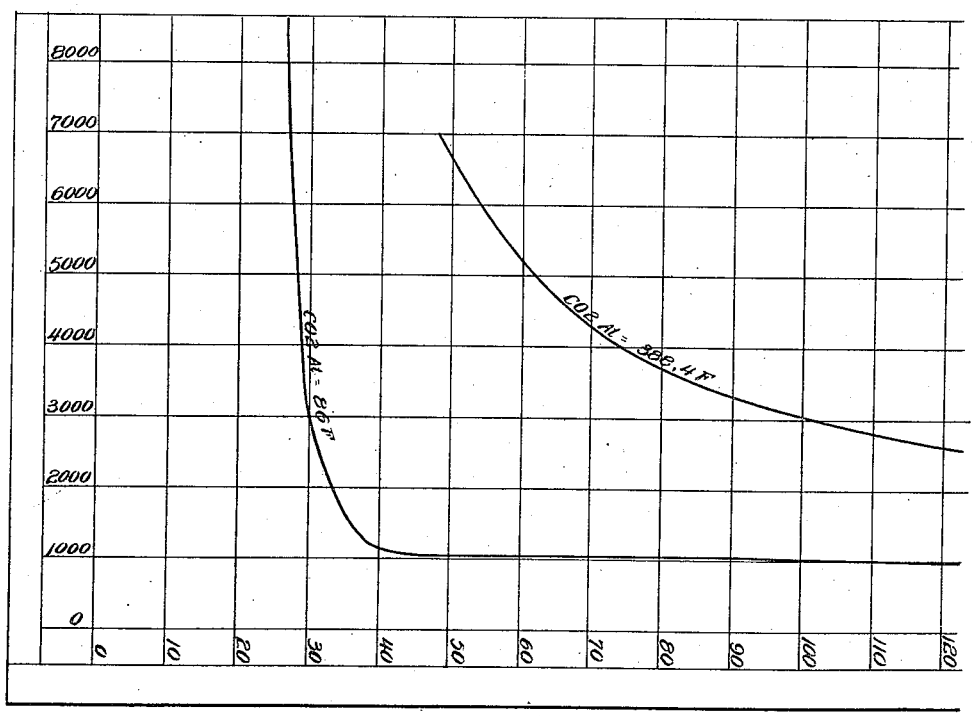

In order that my invention may be better understood, I have illustrated an embodiment thereof in the accompanying drawings, in which, Figure 1 illustrates in side elevation, and partly in section, an engine and power generating apparatus embodying the invention. Fig. 2 is a section on the line 2—2 of Fig. 1. Fig. 3 is a section on the line 3—3 of Fig. 1. Fig. 4 is a central vertical section through the engine and pump shown in Fig. 1. Fig. 5 is an enlarged central vertical section through the pump cylinders and showing the valve for controlling the pump. Fig. 6 is a section on the line 6—6 of Fig. 5. Fig. 7 is a section on the line 7—7 of Fig. 5. Fig. 8 is a longitudinal section through the cut-off valve for the engine cylinders. Fig. 9 is a section on the line 9—9 of Fig. 8. Fig. 10 is a view showing in diagrammatic form an apparatus embodying my invention. Fig. 11 illustrates a theoretical power diagram for my invention. Fig. 12 is a chart showing graphically the relative volumes of a given quantity of carbon dioxid for various pressures and temperatures.

Referring to Fig. 12 it will be observed that I have indicated a scale of pressures along the left-hand margin of the chart, and a scale of volumes in cubic inches for one pound of carbon dioxid under different pressures and temperatures. The curves shown are isothermal lines for carbon dioxid at different temperatures. The critical temperature of carbon dioxid is approximately 87.5° F. and therefore the isothermal for 86° F. is the nearest line on the chart to the critical temperature. This line is so close to the critical temperature that it shows fairly well the behavior of the carbon dioxid in its critical condition. It will be seen that at 86° F., and when being compressed isothermally from a volume of 120 cubic inches at about 1000 lbs. pressure per square inch, which is slightly below the critical pressure, carbon dioxid only increases in pressure about 100 lbs. while the volume is being reduced to 40 cubic inches or to one-third of its original volume. Further compression from this point to 30 cubic inches increases the pressure very rapidly to 3000 pounds per square inch and under additional compression it behaves practically like a liquid. It will be observed that at 6000 pounds pressure the volume is about 27.5 cubic inches and that if it is then heated to 388° F. or the temperature corresponding to the pressure of saturated steam at about 202 pounds per square inch, the volume will be increased to 54 cubic inches or practically doubled. If the carbon dioxid is then expanded adiabatically to its original volume of 120 cubic inches, the temperature and pressure will be reduced to a point on the 120 ordinate lying above the isothermal for 86° F. If at the end of the expansion, the carbon dioxid is exhausted to its original pressure of about 1000 pounds and it is cooled to 86° F., its condition will be the same as at the beginning of the cycle. If, however, instead of exhausting the carbon dioxid to 1000 pounds pressure, it is exhausted to 1100 pounds it will be seen that the volume may be reduced from 120 cubic inches to 40 cubic inches by merely cooling the fluid to 30° C. I take advantage of this fact in my cycle by cooling the carbon dioxid before it is returned to the compressor, and therefore have to handle only a relatively small volume in the compressor and in compressing the small volume it behaves much like a liquid.

In Fig. 10 I have shown diagrammatically an apparatus for carrying out this cycle of operations, in which there is an engine of the single acting type comprising a cylinder 31 and piston 32. A connecting rod 33 connects the piston 32 with a lever 34 which is pivoted at 35 to the fixed bracket 36. A pump 37 comprising a cylinder 38 and a piston 39, is operated from the lever 34 by means of the connecting rod 40. The engine is provided with an inlet valve 41 which is actuated from the lever 34 by means of the rod 42. The valve 41 is provided with a port 43 which registers with the inlet passages 44 and 45, leading from the inlet pipe 46 to the cylinder. The valve 41 also has at its end a lug 47, through which the rod 42 passes. This lug is engaged by stops 48 and 49 on the rod 42 as this rod reciprocates, thereby opening and closing the passage leading to the cylinder. The engine is provided with a somewhat similarly arranged exhaust valve 50, having a port 51, which is adapted to register with the passages 52 and 53, leading from the cylinder to the exhaust pipe 54. The valve 50 is also provided with a lug 55, through which passes the valve rod 56, having pivotal connection with the extension 57 on the lever 34. The rod 56 is provided with stops 58 and 59 which are adapted to engage the lug 55 and move the valve. The pump 37 is provided with an inlet valve 60 and a discharge valve 61, both of these valves being of the spring closing type. The working fluid is received under low pressure by the pump through the inlet pipe 62 and discharged under high pressure through the pipe 63.

Within the pump cylinder I have shown in dotted lines the theoretical indicator card, the piston being shown at the end of the suction stroke. The line A represents the suction and the line B the compression stroke. It will be noticed that on account of the working fluid being received in the pump when substantially at critical temperature and critical pressure, the compression curve B rapidly rises, as was explained in connection with Fig. 12. While the piston is moving from the point C to the end of the discharge stroke the working fluid acts substantially as a liquid and will be discharged under constant pressure. The pipe 63 leads to a heat interchanger 64 where the high pressure working fluid receives heat from the exhaust from the engine, which is received by the heat interchanger from the exhaust pipe 54 and is discharged through the pipe 65. From the heat interchanger 64 the high pressure working fluid passes to the heater 66, in which it is heated preferably by steam under a pressure of from 50 to 200 pounds. The steam is received by the heater through the pipe 67, which is provided with a suitable stop valve 68 and leaves the heater through the pipe 69, which is provided with a stop valve 70. The high pressure working fluid passes from the heater 66 to the engine 30 by means of the pipe 46.

The piston 32 is shown at the end of the working stroke and I have shown in dotted lines within the cylinder a theoretic power diagram. In this diagram the line D represents the admission, the cut-off being at E, and the line F represents the expansion. At the end of the expansion period the exhaust valve will open and the pressure drop to that of the exhaust line G.

It will be observed that owing to the fact that carbon-dioxid occupies such a relatively small volume at the critical temperature, I am able to use a pump cylinder of much less capacity than the engine cylinder and at the same time handle all of the fluid which passes through the engine cylinder.

In order to increase the efficiency of the apparatus I have provided the heat interchanger 64 which will preferably be of the counter current type and will be adapted to permit the fluid exhausted by the engine to give up its heat to the fluid discharged by the pump so that by the time the high pressure fluid leaves the heat interchanger its temperature will have been raised to a substantial degree and the low pressure fluid leaving the heat interchanger will have its temperature reduced to about the temperature of the fluid leaving the pump.

In order to further reduce the temperature of the low pressure working fluid before it enters the pump, I provide a cooler 71, which will preferably cool the exhaust fluid to substantially critical temperature whence it will pass to the pump 37 by means of the pipe 62.

In order to provide for circumstances under which the pump will discharge more high pressure fluid than can be utilized in the engine, I have shown an automatic relief valve 72, which is adapted to open and by-pass a certain amount of the high pressure fluid into the low pressure side of the system when a certain predetermined pressure has been exceeded.

The apparatus will be provided with suitable pressure gages 73 and other instruments to indicate the condition of the working fluid in the various parts of the apparatus.

In Figs. 1 to 9 I have illustrated a practical embodiment of the invention. The apparatus shown in these figures comprises an engine 80, of the double acting type, a pump 81 also of the double acting type, a heat interchanger 82, a heater 83, and a cooler 84. These parts all correspond to the parts of the apparatus shown diagrammatically in Fig. 10 and will now be described in detail. The engine 80 consists of the oppositely arranged cylinders 85 and 86 which are in axial alinement and provided with the plungers 87 and 88. The plunger 87 is connected with a cross head 89 and the plunger 88 is connected with the cross head 90, these cross heads being also connected together by the bolts 91, which are arranged in sleeves 92, these sleeves acting as spacers to maintain the cross heads in proper position. On referring to Fig. 5 it will be observed that the cylinders are separated by a partition 93 in which the ports 94 and 95 leading to the cylinders are located. The admission and exhaust of the working fluid is controlled by means of the main valve 96 and the cut-off valve 97. The main valve is preferably constructed as shown in Figs. 6 and 7 and comprises a casing 98 having an opening therethrough to receive the valve 99. An inlet port 100 communicates with one portion of the opening for the valve and an outlet port 101 communicates with another portion thereof. The valve is preferably in the form of a frustum of a cone so that wear between the valve and its seat as it oscillates may be taken up by moving the valve axially. Between the ports 100 and 101 are the ports 94 and 95 which lead to the cylinders. Communication is established at the proper intervals between the inlet port 100 and the ports 94 and 95 by means of a diagonally arranged port 102 in the valve 98, and the port 103 in the valve establishes communication between the outlet 101 and the ports 94 and 95. For the purpose of balancing the side pressure on the valve and permitting the latter to be moved freely suitable balancing ports 104 and 105 are provided. Referring to Fig. 5 it will be seen that communication between the port 104 and the port 95 is established by means of openings 106 and 107 which intersect and have their outer ends closed by means of plugs 108. In a similar manner the ports 94 and 105 are connected by the openings 109 and 110, these openings being closed by plugs 111. The valve 99 has a suitable stem 112 which is provided with a reduced portion 113 forming a shoulder 114, against which bears the collar 115. One end of the opening through the valve casing is enlarged as at 116 to receive the collar 115 and has its outer end screw-threaded to receive the nut 117. The nut 117 is provided with a suitable bushing 118 and between the inner end of the nut and the collar 115 there is a ball thrust bearing 119 which may be adjusted by means of the nut 117, which is adapted to take the thrust due to the end pressure on the valve 99 and which may be adjusted by means of the nut 117. For convenience the valve casing is made in two parts which are screw-threaded together as indicated at 120. Between the port 100 and the enlarged opening 116 there is a packing ring for the valve stem which is in the form of a sleeve 121 having a flange 122 which is arranged between the ports of the casing. An annular groove 123 is formed in the sleeve 121 near its inner end and a port 124 extending longitudinally of the sleeve and transversely through the flange 122 communicates with another port 125 which leads to the exterior of the casing. It will be seen that by this construction any leakage along the valve stem will be intercepted by the groove 123 and carried off by means of the ports 124 and 125. The outer end of the valve stem 112 is suitably formed to receive an arm 126 carrying a pin 127, to which is connected the actuating rod for the valve.

In axial alinement with the engine 80 is the pump 81 which is constructed in substantially the same manner as the engine, except that the plungers are of smaller diameter than the engine plungers. The valve 128, which controls the intake and discharge of the fluid handled by the pump, is similar to the valve 95, and therefore a description thereof need not be given. The outer ends of the plungers 129 and 130 of the pump are connected respectively to the cross heads 90 and 131 and these cross heads are held in spaced relation and rigidly connected together by means of the bolts 91, these bolts being connected at one end with the cross head 89 and at the other end with the cross head 131. The cross head 131 is provided with a suitable wrist pin 132 which receives one end of the connecting rod 133, the other end of this rod being connected with the crank pin 134 carried by the crank 135 on the shaft 136. The shaft 136 is mounted in suitable bearings 137 and 138 and carries on its outer end the fly wheel 139.

The cylinders of the pump are mounted on frames 140 and 141, these frames being formed with suitable guides 142 and 143 for the cross head 131 and being secured to a suitable base plate 144. The engine cylinders are carried on the pump cylinders by means of suitable brackets 145 and 146.

The cut-off valve 97 is shown in detail in Figs. 8 and 9 and consists of a casing 147 which is preferably formed integral with the casing 98 of the main valve and has a port which is connected with the inlet port 100 of the main valve. The casing has a longitudinal bore therethrough, one end of which is closed by means of the plug 148 and the other end is closed by means of the nut 149. The valve 150 is in the form of a section of a frustum of a cone and has integrally formed therewith a stem 151, the outer end of which has suitably secured thereto a crank 152 carrying the crank pin 153. The central bore through the casing is enlarged as at 154 to form a chamber with which the supply or inlet pipe connects. In operation the valve 150 is oscillated so as to admit the working fluid from the chamber 154 to the port 100 and to close the port at the point of cut-off. In order to balance the side thrust on the valve 150 due to the pressure in the port 100 (see Fig. 9) openings 155 and 156 are provided. These openings, as will be observed, are connected together, their outer end being closed by means of a plug 157. By this means pressure is transmitted from the port 100 to a port 158 on the opposite side of the valve and of equal area so that the side pressure is balanced in both directions. The central bore in the casing 147 is enlarged as at 159 to receive the packing ring 160. This ring is in the form of a sleeve which fits in the opening 159 and has a projection 161 toward the valve 150, and near the end of this projection there is an annular groove 162. This groove communicates with a port 163 which extends longitudinally of the extension 161 and is connected with a conduit 164 leading to the exterior of the valve casing. An annular chamber 165 is formed in the wall of the ring 160 and communicates at one end with an annular groove 166 on the interior of the ring. A conduit 167 communicates with the chamber 165. The nut 168 has screw-threaded engagement with the casing and is adapted to hold the packing ring 160 in position. Beyond the nut 168 the valve stem 151 is reduced in size and carries the ring 169 between which and the nut 149 there is a ball thrust bearing 170. In order to prevent leakage along the valve stem a pressure fluid is conveyed to the chamber 165 by means of the conduit 167 and tends to force the inner wall of the ring 160 against the stem. The groove 162 is for the purpose of collecting any fluid which tends to leak along the valve stem, this fluid being conveyed to the exterior of the valve casing by means of the conduit 164.

For the purpose of actuating the valves there is a bracket 171 secured to one of the engine cylinders and carrying a shaft 172, on which is mounted the bell crank 173. One arm of the bell crank 173 is pivotally connected with one end of the rod 174, the other end of this rod being connected with the pin 175 which is mounted on the bevel gear 176. The other end of the bell crank is pivotally connected with one end of a rod 177 which has its other end connected with the crank pin 153 by means of a universal joint 178. It will be seen that by this mechanism the cut-off valve will be oscillated as the gear 176 is rotated. The gear 176 is mounted on a hollow shaft 179, this shaft being carried in bearings 180 and 181. Arranged with the shaft 179 is the shaft 179' which carries the bevel gear 182 and this gear carries the pin 183. The crank 126 which actuates the pump valve has its pin 127 connected with the pin 183 by means of a rod 184. The crank 126 for actuating the pump valve is also provided with a second pin 185 and this pin is connected with the pin 127 on the actuating arm 126 for the main valve of the engine by means of a rod 186. This mechanism is adapted to oscillate the main valve of the engine and the valve for controlling the pump as the gear 182 rotates. A gear 187 is mounted on the shaft 136 and meshes with the gear 182 for the purpose of rotating the latter. A spindle 189 is pivotally connected with the shaft 179 between the bearings 180 and 181 and carries a bevel gear 190 which meshes with the gear 176 and with the bevel portion of the gear 182. The outer end of the spindle 189 is bifurcated and carries the nut 191, the nut being secured in position by means of trunnions 192. A bracket 193 is secured to any suitable stationary part of the machine, as shown in Fig. 2, and has mounted in its upper end the screw 194 which engages the nut 192 and is held against axial displacement by means of the cooler and the hand wheel 196 which are arranged on opposite sides of the bracket 193, the hand wheel also serving as means for rotating the screw 194 so as to swing the spindle 189 on the shaft 179.

It will be understood that by the mechanism just described the gear 176 is driven from the gear 187 through the gears 182 and 190 and therefore in order to change the point of cut-off for the engine it is only necessary to swing the spindle 189 on the shaft 179 so as to change the relative angular positions of the crank pins 179 and 183, thereby making the cut-off earlier or later with respect to the main valve, according to the direction in which the hand wheel 196 is rotated. It will be also understood that this mechanism is adapted to minutely adjust the point of cut-off to suit the conditions under which the machine is working.

In Fig. 5 I have shown an enlarged detail of the means for packing the piston rod so as to prevent leakage. This packing is generally similar to that used for packing the stem of the cut-off valve 150 and consists of a ring 197 which is provided with a flange 198 and a reduced portion 199. The ends of the cylinders are suitably bored out to receive this ring and also the nut 200, which is preferably screw-threaded, into the cylinder and is adapted to bear against the flange 198 so as to hold the ring in position. The inner end of the ring 197 is made thin, as indicated at 199, so as to make it more flexible. An annular groove 201 is formed on the interior of the ring adjacent its inner end and is in communication with a port 202 which extends longitudinally of the ring and is connected with a conduit 203. The purpose of the groove 201 is to collect any leakage along the piston rod and discharge the same through the conduit 203. An annular chamber 204 is formed in the wall of the ring and the metal at the inner end of the chamber 204 which separates the chamber from the interior of the ring is cut away to form an annular groove 205. A port 206 in the flange 190 communicates with the chamber 205 and with a conduit 207. By means of this construction a suitable fluid under pressure may be admitted to the chamber 204 by means of the conduit 207 and compress the wall, which separates the chamber from the piston rod, against the latter so as to prevent, as far as possible, leakage along the rod. In order to further prevent leakage along the rod I provide an additional annular chamber 208 in the ring 197, thus providing a thin wall 209 which separates the chamber 208 from the interior of the ring. A conduit 210 communicates with the chamber 208 for the purpose of supplying fluid thereto so as to compress the wall 209 against the piston rod.

Referring now to Fig. 1 it will be observed that the heat interchanger 82 comprises a hollow casing which is divided into three chambers 211, 212 and 213 by means of the partitions 214 and 215. The ends of the casing are closed by means of plugs 216. The chambers 211 and 213 are connected by means of a plurality of helically formed intertwined tubes 217, this arrangement of the tubes permitting their ends to be rigidly secured in the partitions 214 and 215 and also permitting them to freely expand and contract under changes in temperature. Owing to the extremely high pressures which I use in my system I have found it necessary to rigidly connect the tubes 217 with the partitions 214 and 215 and therefore have had to provide means which would allow the tubes to freely expand and contract and I think the arrangement is very satisfactory in this respect. I preferably construct the heater 83 and the cooler 84 similar to the heat exchanger 82.

In operation the high pressure fluid is supplied to the engine by means of the pipe 218, this pipe being connected with the inlet for the cut-off valve chamber. The exhaust fluid from the engine passes through the pipe 219 to one end of the chamber 212 of the heat exchanger and then longitudinally through this chamber to the pipe 220 which conducts the fluid to the chamber 221 of the cooler and thence through the pipes 222 of the cooler to the chamber 223. The fluid is passed from the chamber 223 through the pipe 224 to the separator 225 which is adapted to remove any foreign matters which may be in the fluid. The separator 225 may be blown out at intervals by means of the discharge pipe 226 and the valve 227. From the separator 225 the fluid passes through the pipe 228 to the inlet for the pump and after being compressed in the pump is discharged through the pipe 229 to the chamber 213 of the heat exchanger. From the chamber 213 the fluid passes through the tubes 217, the flow through the tubes being counter to the flow of the exhaust fluid through the chamber 212 so that the maximum amount of heat is absorbed by the high pressure fluid from the exhaust fluid. From the tubes 217 the fluid is discharged into the chamber 211 and then through the pipe 230 into the chamber 231 of the heater and from this chamber it passes through the tubes 232 to the chamber 233 and from the latter through the pipe 234 and the separator 235 to the inlet pipe 218 for the engine. In order to heat the high pressure fluid as it passes through the tubes 232 steam or any other suitable heating medium is supplied through the pipe 236 to the chamber 237 of the heater and is discharged from this chamber through the pipe 238. In order to cool the exhaust fluid as it passes through the tubes 232 of the cooler 84 water or any other suitable cooling medium at a suitable temperature is admitted to the chamber 239 of the cooler by means of the pipe 240 and is discharged from the chamber 239 by means of the pipe 241.

The heater and cooler, as well as the heat exchanger, are of the counter flow type and are therefore adapted to give the maximum efficiency. On account of the system being of the "closed type" it will sometimes be necessary to by-pass a certain portion of the high pressure fluid into the low pressure side of the system and in order to accomplish this I have provided a valve 242 which controls the by-pass 243 connecting the pipe 229 with the chamber 212 of the heat exchanger. This valve is held against its seat by means of a spring and is adapted to open when the pressure in the pipe 229 exceeds a predetermined amount, thereby by-passing a certain amount of the high pressure fluid into the low pressure side of the system.

Having thus described the principles of my invention and an apparatus for carrying out the same I will now describe Fig. 11 which is a reproduction, on a reduced scale, of a power diagram showing the energy absorbed by and the work done by one pound of carbon dioxid in my thermodynamic process.

Referring to Fig. 11, the line X—X represents zero pressure above atmosphere and Y—Y represents zero volume. In this instance the high pressure side of the system, which is represented by the line A—C is 3000 lbs. per square inch and the low pressure, which is represented by the line $j$—$d$ is 1100 lbs. per square inch. The high temperature of the system is taken at 333° F. and the low temperature at 86° F. Assuming the starting point to be at $k$ in the diagram which indicates the condition of the carbon dioxid as it enters the pump, the temperature being 86° F., the pressure 1100 lbs. per square inch and the volume 40 cubic inches. In the pump the fluid is compressed to a pressure of 3000 lbs. per square inch, $k$—$b$ being the line of compression, and the total work done being represented by the area $f$—$k$—$b$—$a$—$h$. Of this work the back pressure performs that represented by the area $k$—$j$—$h$—$f$ so that the net work required to compress the fluid is represented by the area $k$—$b$—$a$—$j$.

In the original diagram of which Fig. 11 is a reproduction, the scale of pressures was 1000 lbs. per square inch per inch and the scale of volumes by 10 cubic inches per inch so that each square inch of area=1000×10= 10000 inch lbs. or 10000÷12=833.3 foot lbs. of work. At $b$ the volume of the fluid is 32 cubic inches and the pressure 3000 lbs. per square inch. Of the work done by the compressor, that represented by the area $f$—$k$—$b$—$g$ is internal work and appears as heat, which raises the temperature of the fluid. The area $f$—$k$—$b$—$g$ was found to be 1.44 square inches and represents 1.44×833=1200 ft. lbs. of work. Since the mechanical equivalent of one heat unit is 778 ft. lbs. it follows that the work done is equivalent to 1200÷778=1.54 heat units. The specific heat of carbon dioxid for changes in pressure under constant volume is 0.172 so that the fluid in being compressed will be raised in temperature 1.54÷0.172= 8.98°, or practically 9° F. so that the temperature at $b$=86°+9°=95° F. After leaving the compressor the fluid passes to the heat exchanger where its temperature is raised 77° or to 172° F. The specific heat of carbon dioxid under 3000 lbs. pressure per square inch between 95° F. and 333° F. is found to be 0.2388 so that 77×0.2388=18.4 units of heat are supplied by the heat exchanger, this heat being derived from the fluid exhausted by the engine.

From the heat exchanger the fluid passes to the heater where its temperature is raised 161° F. from 172° to 333° F. so that 161×0.2388=38.46 units of heat are supplied by the heater, this heat being derived from an external source.

The condition of the fluid at this point in the cycle, where it is admitted to the engine, is represented on the diagram by the point $c$. The expansion from point $b$ to point $c$ takes place in the engine before the inlet valve is closed, the valve being closed at $c$ and the fluid being then expanded adiabatically to the point $d$ where the pressure is 1100 lbs. and the volume 205 cubic inches. The work done during the expansion from $c$ to $d$ is represented by the area $c$—$d$—$e$—$n$ of which that represented by $d$—$e$—$n$—$m$ is against the back pressure and $c$—$d$—$m$ is the useful work. The area of $c$—$d$—$e$—$n$= 21.1 cubic inches which is equivalent to 21.1×833.3=17583 ft. lbs. of work and to 17583÷778=22.6 units of heat. The specific heat during this expansion is 0.172 so that the change in temperature equals 22.6÷0.172= 131.6° and the temperature of the fluid therefore, at $d$ which is the exhaust equals 333°—131.6°=201.4° F. From the engine the fluid passes to the heat exchanger where as above stated it gives up 18.4 units of heat to the high pressure fluid. In being cooled at 1100 lbs. pressure from 201.4° F. the specific heat of carbon dioxid is 0.316 so that its temperature is reduced 18.4÷0.316= 58.2° or to 201.4—58.2=143° F. From the heat exchanger the fluid passes to the cooler where its temperature is reduced from 143° F. to 86° F. or 57°, and it gives up 57×0.316=18.04 units of heat.

It will be observed that the work done against the back pressure is exactly equal to that done by the back pressure, and that the work absorbed by the compressor is recovered during the expansion so that the net external or useful work is represented by the area $b$—$c$—$d$—$k$—$b$ which equals 19 square inches, which is equivalent to 19×833.3=15833 ft. lbs. of work or 15833÷778=20.35 units of heat.

The thermal efficiency of the system which may be taken as the ratio of the external work done by the engine to the heat supplied by the heater, is therefore 20.35÷38.46=0.529 or 52.9%. The influence of the heat exchanger on the efficiency of the system is illustrated as follows: Without the heat exchanger the heater would have to supply all of the heat or 38.46+18.4=56.86 units. All of this heat is expended in the engine and the cooler so that the thermal efficiency would be 20.35÷56.86=.358 or 35.8%.

Of the total heat supplied to the compressed fluid the heat exchanger supplies 18.4 units and the heater 38.46 units so that the amount supplied by the heat exchanger is 18.4÷(18.4+38.46)=0.323 or 32.3% of the total.

So far as I am aware, no power system has heretofore been devised in which it is possible to derive such a large percentage of the heat from the exhaust, and this is possible in my system because I maintain the working fluid above the critical point and therefore eliminate latent heat, which, in the prior systems is lost at the cold end of the system. This feature enables me to obtain a very high thermal efficiency and I therefore claim the same broadly as my invention.

Having thus described my invention, what I claim is:

1. The method of employing carbon dioxid, as a medium for converting heat into work, which consists in successively compressing the carbon dioxid, heating it, expanding it in an engine, and cooling it, and wherein the lowest pressure during these operations is not substantially less than critical pressure.

2. The method of employing carbon dioxid, as a medium for converting heat into work, which consists in successively compressing the carbon dioxid, heating it, expanding it in an engine, and cooling it, and wherein the temperature at the beginning of the compression is substantially the critical temperature.

3. The method of employing carbon dioxid, as a medium for converting heat into work, which consists in successively compressing the carbon dioxid, heating it, expanding it in an engine, and cooling it, and wherein the pressure during these operations is not substantially less than critical pressure and the temperature is not substantially less than critical temperature.

4. The method of employing carbon dioxid as a medium for converting heat into work, which consists in successively compressing the carbon dioxid from substantially critical temperature and pressure, heating it by the absorption of heat from a relatively hotter body, expanding it in an engine to a pressure above critical pressure and a temperature above critical temperature, exhausting it to substantially critical pressure, and cooling it to substantially critical temperature.

5. The method of employing carbon dioxid, as a medium for converting heat into work, which consists in successively compressing the carbon dioxid, heating it, expanding it in an engine, and cooling it, utilizing the exhaust from the engine to heat the compressed fluid, the temperatures and pressures throughout the cycle of operation being such that more than one fourth of the heat supplied to the compressed fluid is received from the fluid exhausted by the engine.

6. In a closed system of the class described, the combination of an engine, a pump, a heat exchanger wherein the low pressure working fluid exhausted by the engine gives up a portion of its heat to the high pressure fluid discharged by the pump, means for further cooling the low pressure fluid before it enters the pump, means for further heating the high pressure fluid between the heat exchanger and the engine, and means for by-passing a portion of the high pressure fluid into the low pressure fluid.

In testimony whereof I affix my signature in presence of two witnesses.

JOHN PATTEN.

Witnesses:
BERT M. KENT,
ARTHUR L. BRYANT.